United States Patent [19]

Lyman

[11] 3,860,300
[45] Jan. 14, 1975

[54] VIRTUALLY ZERO POWERED MAGNETIC SUSPENSION

[75] Inventor: Joseph Lyman, Kennebunk, Maine

[73] Assignee: Cambridge Thermionic Corporation, Cambridge, Mass.

[22] Filed: Dec. 20, 1972

[21] Appl. No.: 317,047

Related U.S. Application Data

[63] Continuation-in-part of Ser. No. 160,384, July 7, 1971, abandoned.

[52] U.S. Cl. ............................................. 308/10
[51] Int. Cl. ........................................ F16c 39/06
[58] Field of Search ........................... 308/10; 74/5

[56] References Cited
UNITED STATES PATENTS

| | | | |
|---|---|---|---|
| 3,243,238 | 3/1966 | Lyman | 308/10 |
| 3,473,852 | 10/1969 | Lyman | 308/10 |
| 3,493,275 | 2/1970 | Stone | 308/10 |
| 3,698,775 | 10/1972 | Gilbert | 308/10 |
| 3,731,984 | 5/1973 | Haberman | 308/10 |

FOREIGN PATENTS OR APPLICATIONS

| | | | |
|---|---|---|---|
| 566,627 | 11/1958 | Canada | 308/10 |

Primary Examiner—R. Skudy
Attorney, Agent, or Firm—Roger Norman Coe; Thomas M. Ferrill, Jr.

[57] ABSTRACT

Two independent, cooperating systems, comprising a permanent magnet system and an electromagnet system, are employed to suspend a movable body. Permanent magnets are employed to carry all static loads; whereas electromagnets are used for control purposes only. Persisting net force producing electrical energization of the electromagnet system resulting from displacement of the movable body is caused to be augmented until the movable body is repositioned to an oppositely displaced position of substantial equilibrium with minimized net force producing electrical energization of the electromagnet system. So using the permanent magnet system in cooperation with the electromagnet system results in magnetic suspension which approaches zero power as a limit regardless of how much mass is freely suspended.

5 Claims, 4 Drawing Figures

VIRTUALLY ZERO POWERED MAGNETIC SUSPENSION

CROSS REFERENCE TO RELATED APPLICATION

This application is a continuation-in-part application of Ser. No. 160,384, filed July 7, 1971, now abandoned.

NASA CONTRACT RIGHTS

The invention described herein was made in the performance of work under a NASA contract and is subject to the provisions of Section 305 of the National Aeronautics and Space Act of 1958, Public Law 85-568 (72 Stat. 435; 42 USC 2457).

1. Field of the Invention

The present invention relates to magnetic suspension systems, and more particularly, it is concerned with providing virtually zero powered magnetic suspension.

2. Background of the Invention

Magnetic suspension of an object without fluid flotation means has been achieved using a pair of electromagnets exerting radial centering forces and opposed axial pulling forces by variably energizing the magnets according to the relative ratio of movement and displacement of the object. An example of such a magnetic suspension system is described in U.S. Pat. No. 3,473,852, which issued to Joseph Lyman. In accordance with that system, a movable body is suspended by use of a pair of electromagnetic force appliers. These force appliers are controlled by stable amplifier means which are mainly responsive to velocity of movement of the body and secondarily responsive to the displacement of the body from a predetermined position between the force appliers. In said system, each electromagnet is composed of an armature and a reentrant cup type stator which has a coil lining inserted inside. The inner and outer pole faces on the stator and armature are substantially coplanar and are configured with confronting circular projections or ridges to produce substantial radial force components in response to, and for overcoming, slight departures from coaxial alignment between the electromagnets and their armatures.

All magnetic suspension systems heretofore suggested for application requiring variations in magnetic field strength have required electromagnets to be used which are continuously activated in order to counteract both static and dynamic loads and thereby maintain the suspended body in the desired position. This has been true even when permanent magnets have been used in magnetic suspension systems and reduced some of the overall power requirements for electromagnets. See, for example, U.S. Pat. No. 3,243,238, which issued to Joseph Lyman, involving magnetic suspension with permanent and electromagnets. Because of the fairly large steady state current requirements of electromagnets in prior magnetic suspension systems, multiple problems have arisen in attempting to obtain a self-contained magnetic suspension system. These problems include thermal problems, size and weight problems and power supply problems.

In 1842 Earnshaw developed a theorem which states that it is impossible to obtain stable magnetic suspension through the use of static fields. This incontestable law has led investigators to conclude that power is required for suspension of a body in a magnetic field. It has been discovered, however, that all static loads, including axial, radial and torsional, of a magnetic bearing can be carried by a field supplied through permanent magnets. This can be achieved, without violation of Earnshaw's theorem, through the use of auxiliary servo systems which function to provide only active control by means of independent auxiliary fields.

SUMMARY OF THE INVENTION

An object of the present invention is to provide improved and more efficient magnetic suspension apparatus.

Another object of the present invention is to provide a system for suspending a movable body wherein two independent, cooperating systems, comprising a permanent magnet system and an electromagnet system, are employed.

A further object of the present invention is to provide a system of virtually zero powered magnetic suspension.

Still another object of the present invention is to provide a magnetic suspension system in which all static loads are carried by the field of permanent magnets.

In accordance with the present invention two independent, cooperating systems, comprising a permanent magnet system and an electromagnet system, are employed to suspend a movable body. The permanent magnet system functions to carry all static loads, whereas the electromagnet system is employed for only control purposes after positioning the suspended body where the system is capable of achieving virtually zero powered magnetic suspension.

BRIEF DESCRIPTION OF THE DRAWINGS

Other and further objects, advantages and features of the invention will be apparent to those skilled in the art from the following detailed description thereof, taken in conjunction with the accompanying drawings, in which.

DESCRIPTION OF THE PREFERRED EMBODIMENTS

Figure 1:
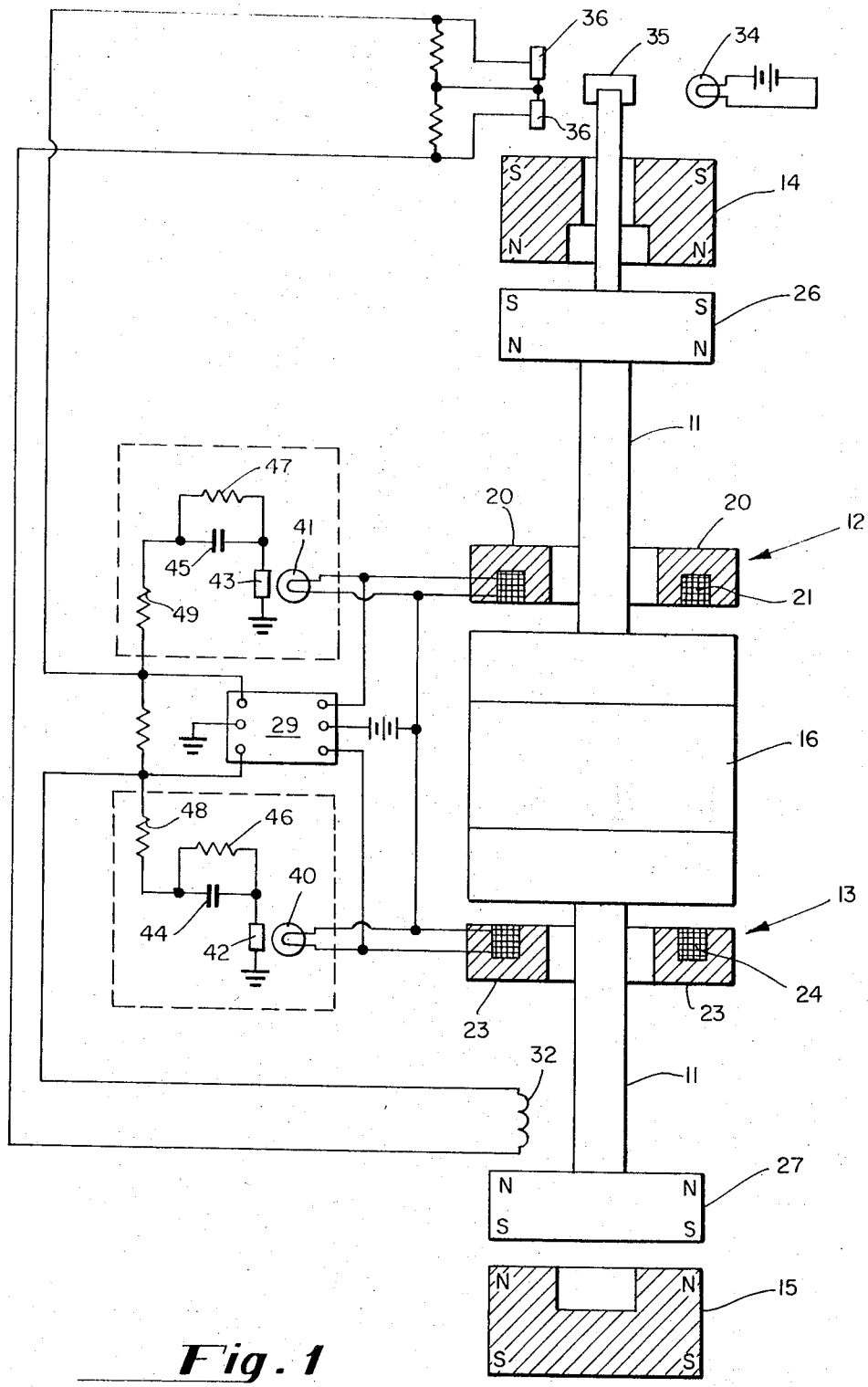
FIG. 1 shows an embodiment of the invention, with portions being shown in cross section.

In FIG. 1, which illustrates an embodiment of the present invention, rigid body 11 is suspended between electromagnets 12 and 13 and permanent magnets 14 and 15. Suspended rigid body 11 is illustrated as the figure of revolution about its longitudinal axis, for example, a cylinder. It can take the form of a gyroscope rotor, or can be vertically arranged as a rotary mass from which a centrifugal chamber is to depend. As with other magnetic suspension apparatus, brushes and mechanical bearings of conventional DC motors, with their attendant problems, are eliminated. For imparting high speed rotation to suspended body 11, a rotating induction field can be produced by motor 16 which surrounds the suspended body.

In addition to electromagnets 12 and 13, discussed below, permanent magnets 14 and 15 are present. Permanent magnets 26 and 27, attached to opposing ends of suspended body 11, act in conjunction with permanent magnets 14 and 15, respectively, to carry all of the static loads of the suspended body. Accordingly, the support for maintaining suspended rigid body 11 in steady state condition is provided by the permanent magnet system comprising permanent magnets 14, 15, 26 and 27. The contribution of these permanent magnets, however, is axially unstable. As suspended body 11 moves toward permanent magnet 15, for example, the force or attraction of that permanent magnet increases and the force or attraction of the opposing permanent magnet 14 decreases. Without the electromagnet servo system, described below, suspended body 11 would be a falling body, supported radially by the fields of the permanent magnets.

Stability, as distinguished from the normal sustaining force, must be provided by electromagnets 12 and 13 which are regulated by differential amplifier 29. Each of the electromagnets comprises two cylindrical permeable members so constructed and arranged as to exert on suspended body 11 a force parallel to the axis thereof when said body is aligned with the axis of the electromagnets, and to exert a force component transverse to the axis of suspended body 11 when it is slightly displaced from the position of coincidence of its axis with the axis of the electromagnets. These electromagnets are energized by direct current, the intensity of energization being differentially controllable.

Outer cylindrical member 20 of electromagnet 12 is composed of permeable material. The electromagnet coil illustrated in the drawing is stationary coil winding 21 inside cylindrical member 20. This electromagnet coil takes the form of a thin cylindrical shell in which overlapped windings are present in a suitable plastic matrix, such as epoxy. Electromagnet 13 is similarly constructed with cylindrical permeable member 23 and stationary coil winding 24.

The electromagnets of the present invention are used as part of the servo system to maintain suspended body 11 in the zero center position or neutral force position which lies on a plane cutting through the magnetic field supplied by the permanent magnets. At or in the region immediately adjacent to the aforementioned plane extremely small forces are required to retain the magnetic "center of gravity" of the suspended body. The servo system, consisting of one or more sense coils, at least two independent electromagnet force coils and one or more differential amplifiers, senses any axial transitional velocity and acts to reduce this velocity and restore suspended body 11 to its original position.

Figure 4:
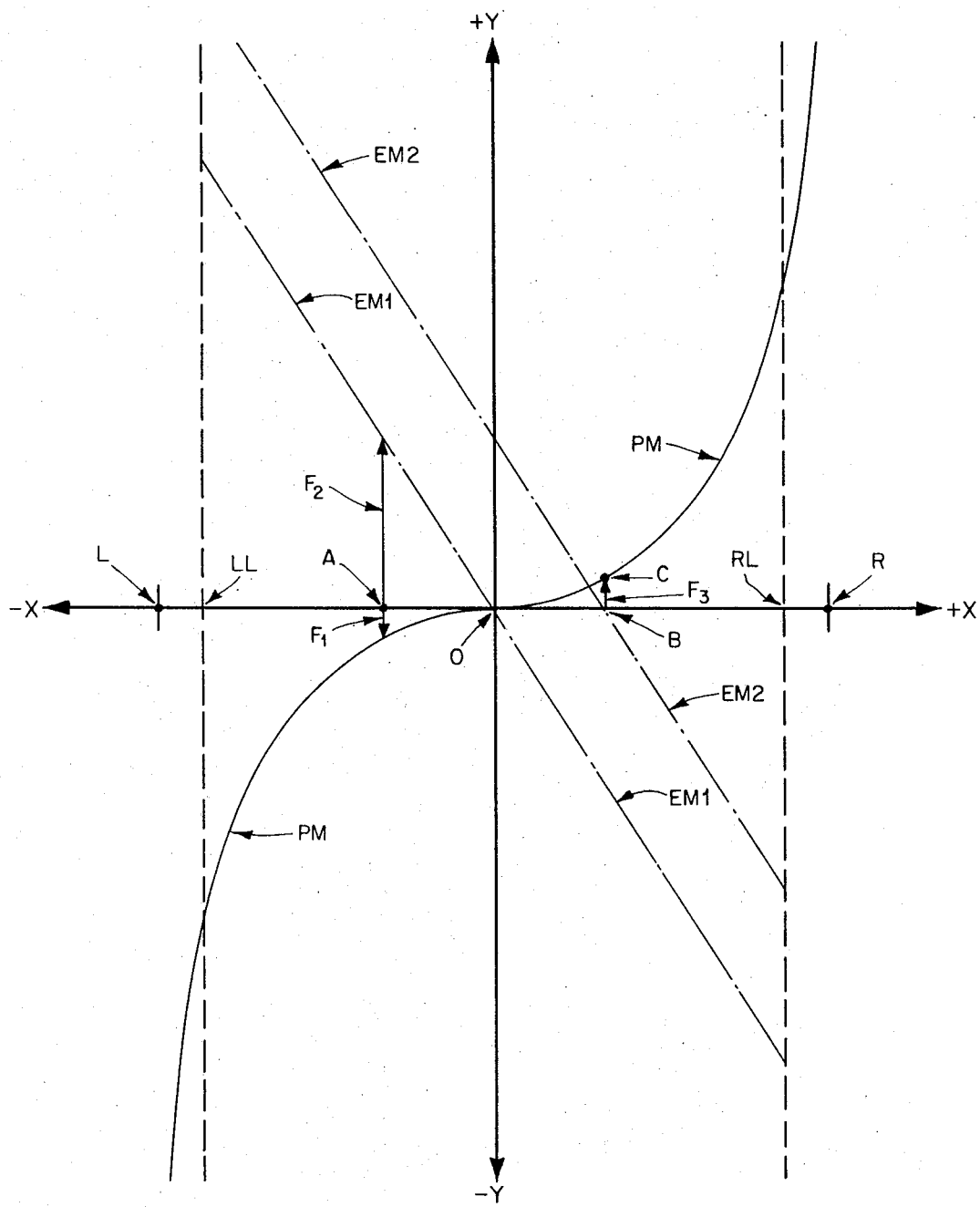
FIG. 4 is a graphical representation of the forces involved in achieving virtually zero powered magnetic suspension.

Since the electromagnets can be regulated, the whole force field can be modified axially. This can be visualized by referring to FIG. 4 in which displacement (on the $x$ axis) is plotted against force (on the $y$ axis). In FIG. 4 curve PM represents the net force of the permanent magnets and line EM1 represents the net force of the electromagnets. The initial slope of line EM1 is much greater than the initial slope of curve PM in order that a body can be maintained in suspension within practical limits (represented by dashed lines LL and RL). If the suspended body is not kept within such limits it might reach final limit position L or R where the gap at the respective ends of the suspended body become zero and the body is no longer magnetically suspended.

If the only forces exerted on the suspended body were the forces applied by the permanent magnets, the suspended body would be maintained at 0 on the graph. Other forces, however, such as gravity, act on the suspended body. If such a force, represented by vector $F_1$, is unopposed, the unopposed force would cause the suspended body to be displaced from 0 by a distance A0 along the $-x$ axis. In the described system, however, the displacing force is opposed. Any displacement of the suspended body from 0 causes a restoring force to oppose the displacement. Since the restoring force opposing displacement is augmented relative to that represented by vector $F_1$, displacement of the suspended body along the $-x$ axis can be slowed to a stop and then reversed. It can be seen that if the suspended body ever reached point A a restoring force represented by vector $F_2$ (many times greater than the force represented by vector $F_1$) would be acting on the suspended body. As the force causing displacement (represented by vector $F_1$) continues the restoring force in accordance with the present invention causes the suspended body to move to a new (oppositely displaced) zero or neutral force position (having displacement 0C) where the force represented by vector $F_3$ is equal and opposite to the force represented by vector $F_1$. Upon reaching the new zero or neutral force position line EM2 (passing through position B) represents the net force of the electromagnets. Accordingly, at this oppositely displaced position the opposing forces are balanced and it is no longer necessary to supply a persistent net force exerting power to the electromagnets until some new force causes a change of displacement. Under such conditions virtually zero powered magnetic suspension is achieved.

Thus, in contrast to the universally recognized procedure of continuously operating electromagnets in magnetic suspension systems in an effort to maintain a suspended body at position 0 shown on FIG. 4, the present invention uses electromagnets only for control purposes — accomplishing this by shifting the whole acceleration field.

One manner of shifting the whole acceleration field as described above is by biasing the amplifier by means of circuits including incandescent lamps 40 and 41 and photocells 42 and 43 for their inertial contribution (See FIG. 1). If movable body 11 moves toward lower permanent magnet 15, and the pull of that magnet is increased, the differential upward pull of upper electromagnet 12 is adjusted to increase much more steeply to restore stability of the overall system. With the supplementary bias action, the electromagnets can be so regulated as not only to reduce the velocity of movable body 11, stop it altogether and even reverse the velocity of said body but to move it upward until it is coincident with a new, oppositely displaced neutral or zero acceleration position. As this new neutral or zero acceleration position, the electromagnets are needed only to maintain the position stably since the permanent magnets carry all static loads, the upper permanent magnet with its closer spacing exerting force sufficiently greater than that exerted by the lower permanent magnet to counteract the accelerating force (e.g., gravity) which first produced the downward displacement of suspended body 11. Virtually zero power is required to maintain the movable suspended body in the neutral or zero acceleration position once the suspended body has been properly positioned.

In FIG. 1, a rate component is obtained from coil 32 and a displacement component is obtained using a photoelectric pick-up device consisting of light source 34, shield 35 and photocells 36–36. The rate component and displacement component are amplified by amplifier 29 and the resulting signals are used to regulate electromagnets 12 and 13. For the reasons previously discussed, the signals supplied to the electromagnets are preferably subjected to a super-imposed bias resulting according to the persisting unequal energization of the upper and lower electromagnets. One suitable means for obtaining such bias is shown in FIG. 1 in dotted lines, which involve light sources 40 and 41, photoelectric cells 42 and 43, capacitors 44 and 45, and resistors 46, 47, 48 and 49.

If desired, the displacement input component to electromagnets 12 and 13 can be discontinued once movable suspended body 11 has attained a neutral or zero acceleration position. This procedure results in further conservation of power. The electromagnets are then adequately regulated by supplying only the rate component to amplifier 29.

Without adjusting the acceleration field, differential upward pull (net) of the electromagnets minus the differential downward pull (net) of the permanent magnets would be necessary to equal a steady state force downward (e.g., gravity) and thereby restore equilibrium. Using the rate component to detect change of displacement of movable body 11 due to the steady state force such as gravity, the entire acceleration field can be shifted so as to cause the movable body to be moved upward, across the original medial position to the place where the permanent magnets provide the necessary net upward pull.

The means for regulating the electromagnets is described in more detail in U.S. Pat. No. 3,473,852, which is hereby incorporated by reference. As previously indicated, the rate component can be obtained by means of one or more coils such as coil 32 in FIG. 1 arranged to cooperate with permanent magnet 27 as an electrodynamic signal source. Movement of the suspended body causes either an increase or decrease in the magnetic flux linkage with the turns of the coil, thereby resulting in an output voltage of a polarity proportional to the rate of movement of the suspended body. The rate and displacement input signals are supplied in series to the input terminals of amplifier 29.

Alternative methods for sensing the rate component can be employed, including an oscillator having a tank circuit coil. A small low powered laser can also be used to provide a measure of displacement and rate of displacement by the Doppler effect.

Figure 2:
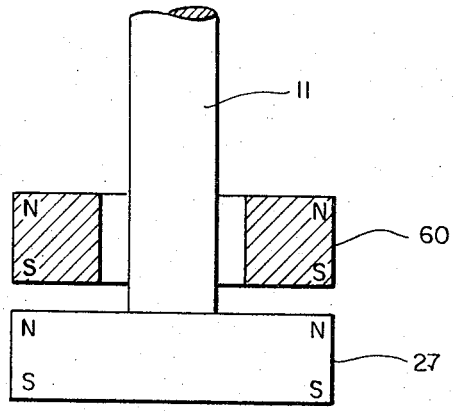
FIGS. 2 and 3 are highly schematic drawings which illustrate the arrangement of permanent magnets in other embodiments of the present invention.

FIG. 2 schematically illustrates another embodiment of the present invention in which permanent magnet 60 is located around suspended body 11, with permanent magnet 27 attached to the end of suspended body 11. Obviously, the size, number, configuration and location of the permanent magnets can be adjusted to conform to limitations imposed by geometry, weight, economics, and the like.

Figure 3:
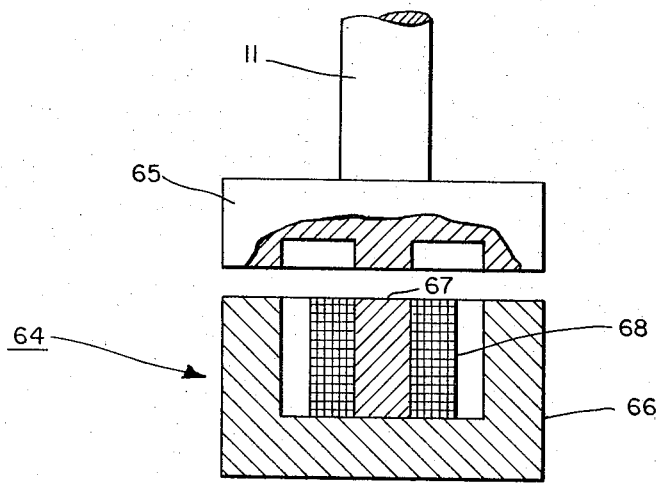

Still another embodiment of the invention is shown in FIG. 3. In the illustrated embodiment a permanent magnet and electromagnet are combined in unit 64, opposite to permanent magnet 65 which is attached to the end of suspended body 11. Unit 64 comprises a hollow cup-like permanent magnet 66 with an electromagnet comprising metal member 67 and electrical winding 68 located inside the hollow portion of the permanent magnet.

If desired, the system shown in the drawings can be horizontally disposed. If the system is operated in the earth's gravitational field, permanent magnets 14 and 15 are then required to exhibit vertical force components equal to the weight of the suspended mass, with the electromagnets acting as a servo system. Actually, the improved apparatus of the present invention permits the apparatus to be used in a variety of different environments, with various amounts of force due to gravity and/or acceleration. The magnetic suspension system will accommodate relative displacements between the suspending portion and the suspended apparatus, including angular as well as translational components.

Thus, there are two fields which can attract the suspended rotor body. These fields are independently applied — one (due to the permanent magnets) being a predetermined function of displacement, and the other being servo controlled. By design, the fields, although independent, cooperate to provide forces sufficient to effect axial centering of the suspended object. The servo system, being designed to be only a supervisory system, does not require or result in a large and continuous power drain.

The permanent magnets can be made from any suitable material such as Alnico, Indox or the like. Preferably, however, permanent magnets are made from samarium cobalt or other rare earth materials in order to conserve space.

From the foregoing, it will be seen that this invention is well adapted to obtain all of the ends and objects hereinabove set forth, together with other advantages which are obvious and which are inherent to the system. The present invention permits a physical object to be suspended in the presence of varying disturbing forces solely through the inherent field existing in permanent magnets with the expenditure of extremely small, and almost nominal, amounts of power needed for control purposes. All static loads are carried by the permanent magnet fields which restrain the suspended object in 5 of the 6° of freedom. For utility, only rotation about one axis is unrestricted.

The magnetic suspension system of the present invention has the following advantages over conventional electromagnetic suspension systems:

1. Thermal problems are virtually eliminated since control coils operate very close to ambient temperatures.

2. The number of electronic components is reduced since electromagnets are used only for control purposes.

3. The power required is reduced substantially since there is no longer a requirement for steady state currents.

4. Significant weight advantages are obtained.

Until the present invention, one very large advantage derived from the use of magnetic bearings was the fact that such bearings could be operated in a vacuum without appreciable friction or wear. However, in competition with gas bearings, or the more conventional ball bearings, magnetic bearings were not truly competitive from the standpoint of power consumption. The present invention has provided for virtually zero power magnetic suspension and renders magnetic suspension apparatus extremely desirable for use in momentum storage devices, reaction wheels, and space satellites as well as opening the door for other applications.

Obviously, many other modifications and variations of the invention as hereinbefore set forth may be made without departing from the spirit and scope thereof.

I claim:

1. Magnetic suspension apparatus for stable support of a movable object without heavy power requirements, comprising:

a movable object having a longitudinal axis;

first and second permanent magnet means for exerting opposing forces on said movable object, said forces being substantially equal and opposite when said movable object is in an initial neutral position and becoming unequal as said movable object moves in the direction of said longitudinal axis toward one of said permanent magnet means and away from the other permanent magnet means under the influence of a persisting displacing force;

electromagnet force applying means for selectively exerting an electrically controllable additional force on said movable object in a first direction along said longitudinal axis or the opposite direction;

servo means including a rate sensing pick up and amplifying means responsive thereto for energizing said electromagnetic force applying means to provide a force greater than the persisting displacing force and the resultant additional net force exerted by the first and second permanent magnet means as the result of the movable object being displaced by the persisting displacing force; and means initially responding to a persisting net energization of the electromagnetic force applying means for biasing said servo means to move said movable object back through said initial neutral position to an oppositely displaced position to impose substantially upon the permanent magnet means the burden of sustaining the movable object and relegating the electromagnetic force applying means to the imparting of stabiizing forces.

2. Magnetic suspension apparatus as defined in claim 1, said servo means including displacement sensing means and the amplifying means being responsive jointly to the displacement sensing means and to the rate sensing pickup.

3. Magnetic suspension apparatus as defined in claim 2 wherein the displacement sensing means comprises a photoelectric device and means movable with said movable object for differently varying light incident upon said photoelectric device.

4. Magnetic suspension apparatus as defined in claim 1 wherein said rate sensing pickup comprises at least one coil situated in the vicinity of permanent magnet means movable with said movable object.

5. Magnetic suspension apparatus for stable support of a movable object without heavy power requirements, comprising:

a movable object having a longitudinal axis;

first and second permanent magnet means for exerting opposing forces on said movable object, said forces being substantially equal and opposite when said movable object is in an initial neutral position and becoming unequal as said movable object moves in the direction of said longitudinal axis toward one of said permanent magnet means and away from the other permanent magnet means under the influence of a persisting displacing force;

electromagnet force applying means for selectively exerting an electrically controllable additional force on said movable object in a first direction along said longitudinal axis or the opposite direction;

servo means including a rate sensing pick up and amplifying means responsive thereto for energizing said electromagnetic force applying means to provide a force greater than the persisting displacing force and the resultant additional net force exerted by the first and second permanent magnet means as the result of the movable object being displaced by the persisting displacing force; and means responsive to a persisting net energization of the electromagnetic force applying means for sensing the need for a redistribution of forces between the electromagnet force applying means and the first and second permanent magnet means, and means responsive to said persisting net energization responsive means for exerting increased force on said movable object in the direction opposite to said persisting displacing force until said movable object is repositioned relative to said first and second permanent magnet means to cause said first and second permanent magnet means to provide a compensating persisting net force.

* * * * *